USO11451355B2

(12) United States Patent
Michael

(10) Patent No.: US 11,451,355 B2
(45) Date of Patent: Sep. 20, 2022

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventor: Lachlan Bruce Michael, Saitama (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 17/040,504

(22) PCT Filed: Mar. 15, 2019

(86) PCT No.: PCT/JP2019/010764
§ 371 (c)(1),
(2) Date: Sep. 22, 2020

(87) PCT Pub. No.: WO2019/188395
PCT Pub. Date: Oct. 3, 2019

(65) Prior Publication Data
US 2021/0028904 A1    Jan. 28, 2021

(30) Foreign Application Priority Data

Mar. 30, 2018    (JP) .............................. JP2018-067909

(51) Int. Cl.
*H04L 5/00*    (2006.01)
*H04H 20/28*    (2008.01)
*H04N 21/643*    (2011.01)

(52) U.S. Cl.
CPC .......... *H04L 5/0048* (2013.01); *H04H 20/28* (2013.01); *H04N 21/643* (2013.01)

(58) Field of Classification Search
None
See application file for complete search history.

(56) References Cited

U.S. PATENT DOCUMENTS

2017/0201336 A1\* 7/2017 Park .................... H04L 27/3488
2018/0076866 A1   3/2018 Chen et al.
(Continued)

FOREIGN PATENT DOCUMENTS

CN    106685863 A    5/2017
CN    108886418 A    11/2018
(Continued)

OTHER PUBLICATIONS

"Transmission System For Digital Terrestrial Television Broadcasting", Association of Radio Industries and Businesses, ARIB Standard-B31(ARIB STD-B31), Version 2.2, Mar. 18, 2014, 195 pages.
(Continued)

*Primary Examiner* — Walter J Divito
(74) *Attorney, Agent, or Firm* — Chip Law Group

(57) ABSTRACT

The present technology relates to a reception apparatus, a reception method, a transmission apparatus, and a transmission method that enable efficient data transmission. When a reception apparatus including a processing unit that, when a transmission signal including transmission data is received, processes the transmission signal including a pilot signal on which layered division multiplexing (LDM) has been performed, and demodulates a part of the transmission data included in a second layer which is different from a first layer including the pilot signal, it is possible to efficiently perform data transmission using the pilot signal. The present technology can be applied to, for example, a broadcasting system compatible with a broadcasting method such as ISDB-T, ATSC, and the like.

10 Claims, 18 Drawing Sheets

(56) References Cited

U.S. PATENT DOCUMENTS

2019/0028238 A1  1/2019  Kimura et al.
2019/0245634 A1  8/2019  Michael et al.

FOREIGN PATENT DOCUMENTS

| EP | 3373535 A1 | 9/2018 |
|---|---|---|
| EP | 3439209 A1 | 2/2019 |
| JP | 2018-046458 A | 3/2018 |
| KR | 10-2018-0063322 A | 6/2018 |
| TW | 201815117 A | 4/2018 |
| WO | 2017/076354 A1 | 5/2017 |
| WO | 2017/170110 A1 | 10/2017 |

OTHER PUBLICATIONS

International Search Report and Written Opinion of PCT Application No. PCT/JP2019/010764, dated May 7, 2019, 09 pages of ISRWO.

Zhang, et al., "Cloud Channel Capacity Distribution of Layer-Division-Multiplexing System for Next Generation Digital Broadcasting Transmission", IEEE, International Symposium on Broadband Multimedia Systems and Broadcasting, XP032635829, Jun. 25, 2014, 06 pages.

Park, et al., "Low Complexity Layered Division Multiplexing for ATSC 3.0", IEEE, Transactions on Broadcasting, vol. 62, No. 1, XP011608942, Mar. 2016, pp. 233-243.

Extended European Search Report of EP Application No. 19775128.2, dated Apr. 6, 2021, 08 pages.

Office Action for JP Patent Application No. 2018-067909 dated May 17, 2022, 2 pages of Office Action and 2 pages of English Translation.

\* cited by examiner

FIG. 4

| Pilot Pattern | 8K FFT | 16K FFT | 32K FFT |
|---|---|---|---|
| TMCC | 2/216=0.93% | 4/432=0.93% | 8/864=0.93% |
| Lch | 4/216=1.85% | 8/432=1.85% | 16/864=1.85% |
| SP 3_1 | N/A | 144/432=33.3% | 288/864=33.3% |
| SP 3_2, 6_1 | 36/216=16.67% | 72/432=16.67% | 144/432=16.67% |
| SP 3_4, 6_2, 12_1 | 18/216=8.33% | 36/432=8.33% | 72/432=8.33% |
| SP 6_4, 12_2, 24_1 | 9/216=4.17% | 18/432=4.17% | 36/432=4.17% |
| SP 24_2 | N/A | 9/432=2.08% | 18/432=2.08% |

Pilot Basics

LDM on pilots

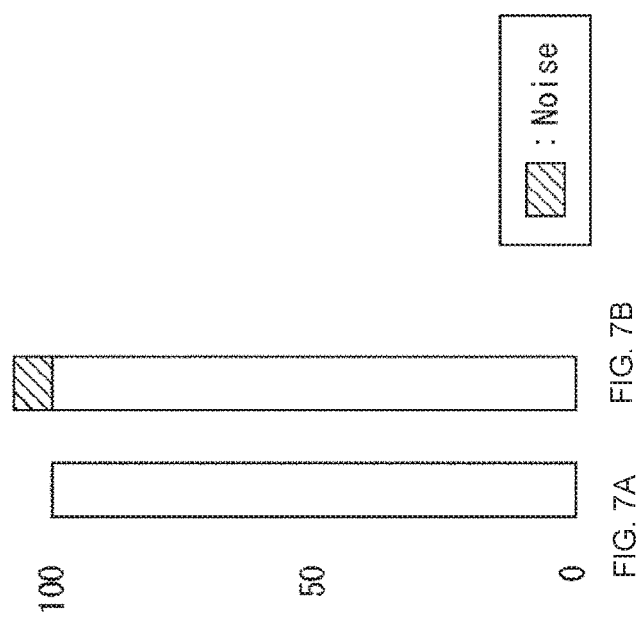

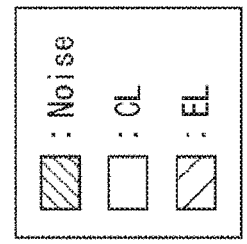
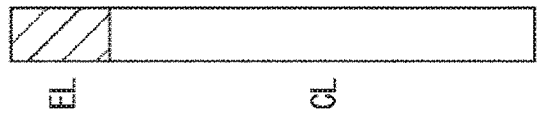
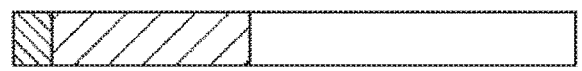
FIG. 8A  FIG. 8B  FIG. 8C  FIG. 8D

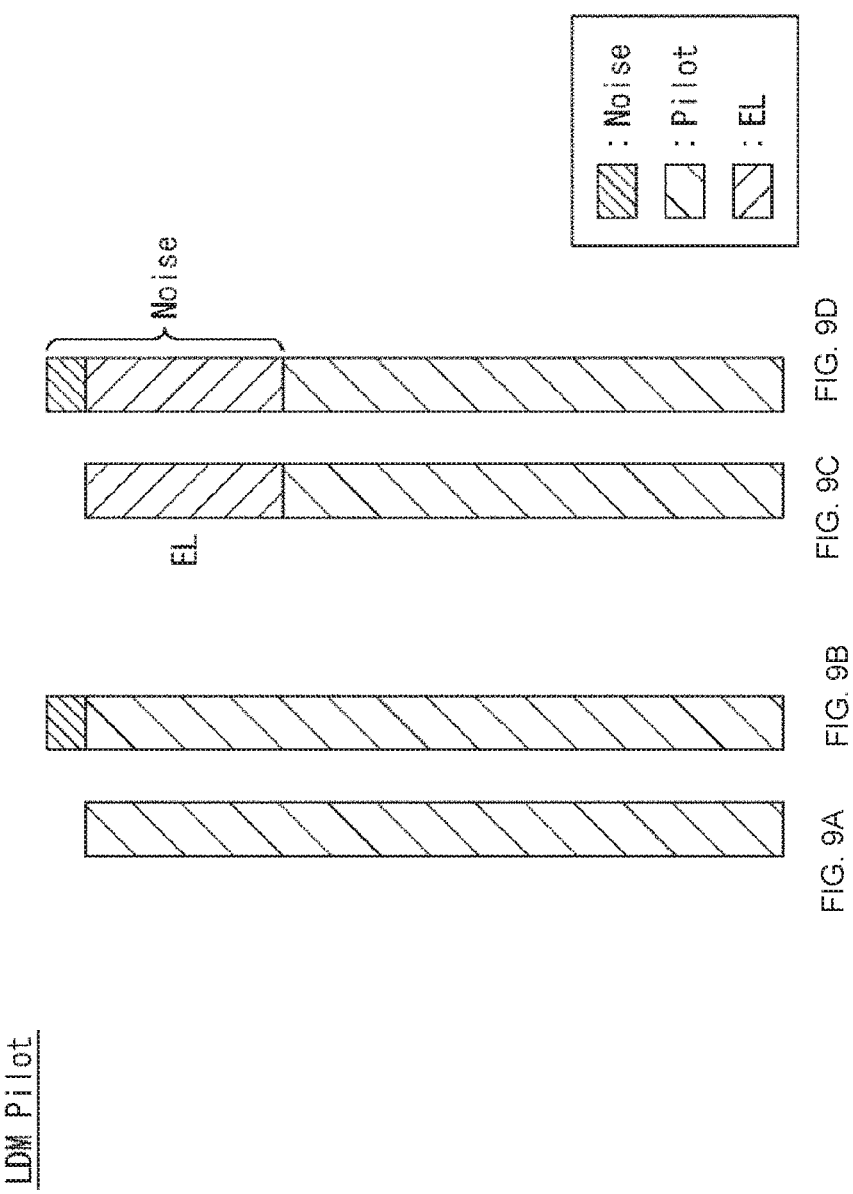

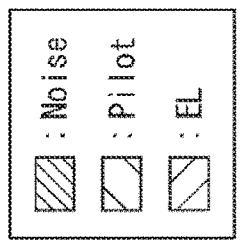
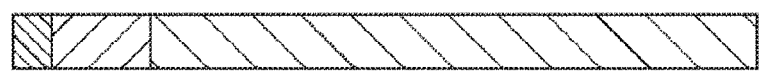
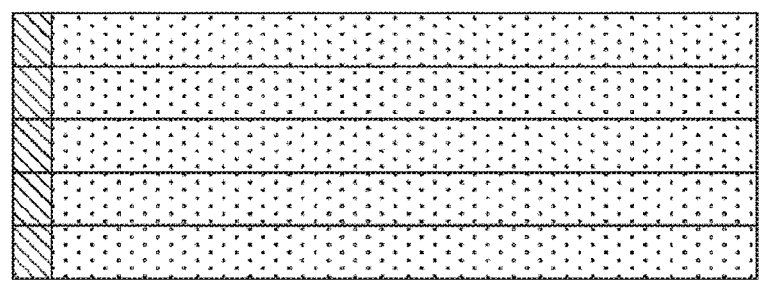
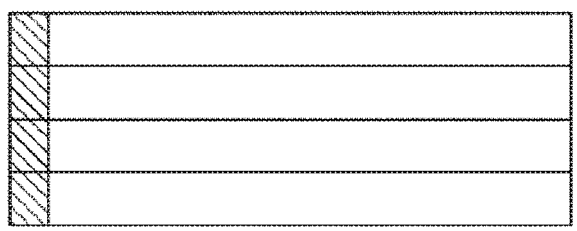
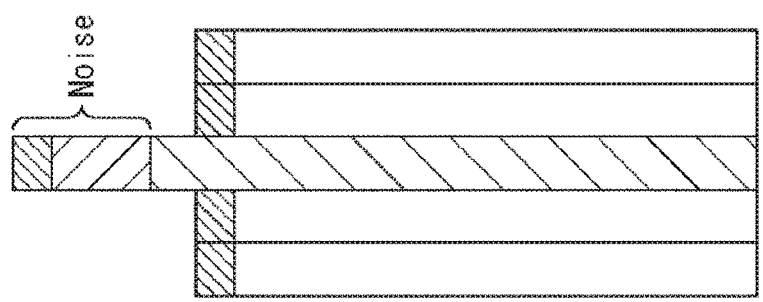

RECEPTION APPARATUS, RECEPTION METHOD, TRANSMISSION APPARATUS, AND TRANSMISSION METHOD

CROSS REFERENCE TO RELATED APPLICATIONS

This application is a U.S. National Phase of International Patent Application No. PCT/JP2019/010764 filed on Mar. 15, 2019, which claims priority benefit of Japanese Patent Application No. JP 2018-067909 filed in the Japan Patent Office on Mar. 30, 2018. Each of the above-referenced applications is hereby incorporated herein by reference in its entirety.

TECHNICAL FIELD

The present technology relates to a reception apparatus, a reception method, a transmission apparatus, and a transmission method, and more particularly, to a reception apparatus, a reception method, a transmission apparatus, and a transmission method that enable efficient data transmission.

BACKGROUND ART

For example, in Integrated Services Digital Broadcasting-Terrestrial (ISDB-T) adopted in Japan and the like as a terrestrial digital television broadcasting method, a frequency division multiplexing (FDM) system is adopted as a system for multiplexing broadcast signals (see, for example, Non-Patent Document 1).

CITATION LIST

Non-Patent Document

Non-Patent Document 1: ARIB STD-B31, Edition 2.2, Association of Radio Industries and Businesses

SUMMARY OF THE INVENTION

Problems to be Solved by the Invention

By the way, studies have been conducted on the advancement toward the next generation of terrestrial digital television broadcasting. For next-generation terrestrial digital television broadcasting, in addition to FDM, a broadcasting system that uses a multiplexing method such as time division multiplexing (TDM) or layered division multiplexing (LDM) has been studied. On the other hand, efficient data transmission is required when constructing a broadcasting system that adopts various multiplexing methods.

For example, a broadcasting method such as ISDB-T, Digital Video Broadcasting-Terrestrial (DVB-T), DVB-T2, or Advanced Television Systems Committee (ATSC) 3.0 requires to transmit a pilot signal such as scattered pilot (SP) signals in addition to transmission data in order to estimate a variable wireless channel. Since no data is transmitted with this pilot signal, the transmission efficiency of the entire transmission signal is reduced.

The present technology has been made in view of such circumstances and enables efficient data transmission.

Solutions to Problems

A reception apparatus of a first aspect of the present technology is a reception apparatus including a processing unit that, when a transmission signal including transmission data is received, processes the transmission signal including a pilot signal on which LDM has been performed, and demodulates a part of the transmission data included in a second layer which is different from a first layer including the pilot signal.

The reception apparatus of a first aspect of the present technology may be an independent apparatus, or may be an internal block constituting a single apparatus. Furthermore, the reception method of a first aspect of the present technology is a reception method corresponding to the reception apparatus of the first aspect of the present technology described above.

The reception apparatus and the reception method of the first aspect of the present technology, when a transmission signal including transmission data is received, process the transmission signal including a pilot signal on which LDM has been performed, and demodulate a part of the transmission data included in a second layer which is different from a first layer including the pilot signal.

A transmission apparatus of a second aspect of the present technology is a transmission apparatus including a processing unit that, when a transmission signal including transmission data is transmitted, processes the transmission signal including a pilot signal on which LDM has been performed, and modulates a part of the transmission data included in a second layer which is different from a first layer including the pilot signal.

The transmission apparatus of a second aspect of the present technology may be an independent apparatus, or may be an internal block constituting a single apparatus. Furthermore, the transmission method of a second aspect of the present technology is a transmission method corresponding to the transmission apparatus of the second aspect of the present technology described above.

The transmission apparatus and the transmission method of the second aspect of the present technology, when a transmission signal including transmission data is transmitted, process the transmission signal including a pilot signal on which LDM has been performed, and modulate a part of the transmission data included in a second layer which is different from a first layer including the pilot signal.

Effects of the Invention

According to the first aspect and the second aspect of the present technology, it is possible to perform data transmission efficiently.

Note that effects of the present disclosure are not necessarily limited to the effects described herein, and may be any of those described herein.

BRIEF DESCRIPTION OF DRAWINGS

FIG. 4 is a table showing an example of overhead due to a pilot signal of a next-generation ISDB-T.

FIGS. 7A and 7B are diagrams showing an example of transmission power in a case where TDM is applied.

FIGS. 8A, 8B, 8C, and 8D are diagrams showing a first example of transmission power in a case where LDM is applied.

FIGS. 9A, 9B, 9C, and 9D are diagrams showing a second example of transmission power in a case where LDM is applied.

FIGS. 13A, 13B, 13C, 13D, and 13E are schematic diagrams for explaining the flow of physical layer processing compatible with ISDB-T.

MODE FOR CARRYING OUT THE INVENTION

Embodiments of the present technology are described below with reference to the drawings. Note that the description is given in the order below.

1. Embodiments of the present technology
2. Variation
3. Configuration of computer 1. Embodiments of the Present Technology (Configuration of Transmission System)

Figure 1:
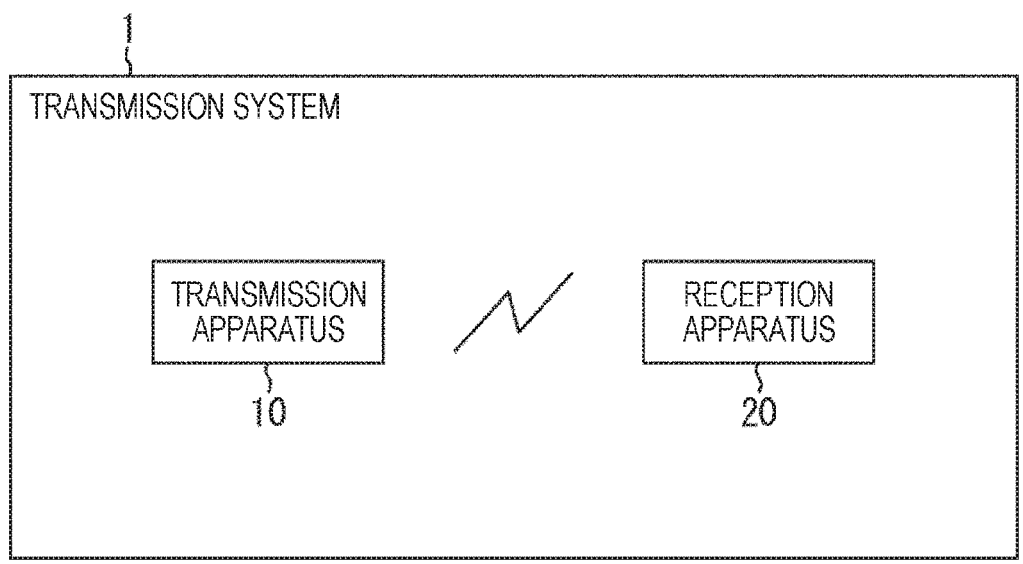
FIG. 1 is a block diagram illustrating a configuration example of an embodiment of a transmission system to which the present technology has been applied.

FIG. 1 is a block diagram illustrating a configuration example of an embodiment of a transmission system to which the present technology has been applied. Note that the system indicates a logical cluster of a plurality of apparatuses.

In FIG. 1, a transmission system 1 includes a transmission apparatus 10 and a reception apparatus 20.

The transmission apparatus 10 transmits (transfers) a television broadcast program or the like, for example.

That is, the transmission apparatus 10 sets content of a program such as video data and audio data, for example, as transmission data to be transmitted, and performs transmission processing necessary for the transmission data. The transmission apparatus 10 transmits a transmission signal (broadcast signal) obtained by performing transmission processing on transmission data, via a transmission path such as a terrestrial wave, a satellite line, a cable (wired line), or the like, for example. The transmission signal (broadcast signal) transmitted by the transmission apparatus 10 includes a pilot signal in addition to transmission data such as content of a program.

The reception apparatus 20 receives a transmission signal (broadcast signal) transmitted from the transmission apparatus 10 via the transmission path, and restores and reproduces the content of the program on the basis of the transmission data included in the transmission signal. For example, the reception apparatus 20 is configured as a television receiver having a display for displaying a video (image) and a speaker for outputting an audio (sound), and displays a video and outputs an audio as the content of the program and the like.

(Configuration Example of Transmission Apparatus)

Figure 2:
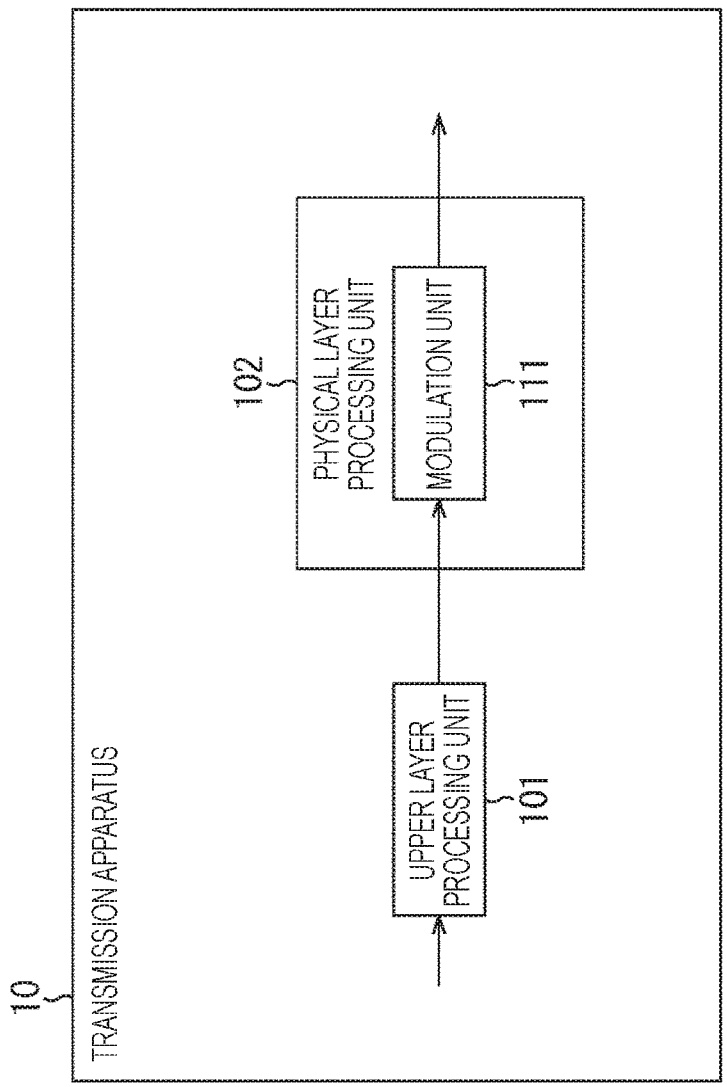
FIG. 2 is a block diagram illustrating a configuration example of a transmission apparatus.

FIG. 2 is a block diagram illustrating a configuration example of the transmission apparatus 10 of FIG. 1.

In FIG. 2, the transmission apparatus 10 includes an upper layer processing unit 101 and a physical layer processing unit 102.

The upper layer processing unit 101 is supplied with a video, an audio, and the like of the content of the program. The upper layer processing unit 101 performs upper layer processing that generates transmission data in a format defined by an upper layer from a video, an audio, and the like of the content of the program, and supplies the transmission data to the physical layer processing unit 102.

That is, the upper layer processing unit 101, for example, as the upper layer processing, performs encoding or the like of the video and audio of the content, generates transmission data including the resultant video, audio and the like, and supplies the transmission data to the physical layer processing unit 102. Note that the transmission data may include data other than the video and the audio, such as signaling and application data, for example.

The physical layer processing unit 102 performs physical layer processing on the transmission data supplied from the upper layer processing unit 101, and transmits a resultant transmission signal. This transmission signal is a broadcast signal such as, for example, an orthogonal frequency division multiplexing (OFDM) signal. Furthermore, the transmission signal includes a pilot signal in addition to the transmission data. That is, the transmission data includes various data excluding the pilot signal.

The physical layer processing unit 102 includes a modulation unit 111. The modulation unit 111 performs modulation processing on transmission data. As the modulation processing, for example, processing such as transmission path coding, calculation of inverse fast Fourier transform (IFFT), and addition of guard interval (GI) are performed. Furthermore, regarding the transmission path coding, for example, error correction coding, mapping as modulation of a data carrier according to transmission data (mapping of transmission data on IQ constellation), frequency interleaving, time interleaving, and the like are performed.

(Configuration Example of Reception Apparatus)

Figure 3:
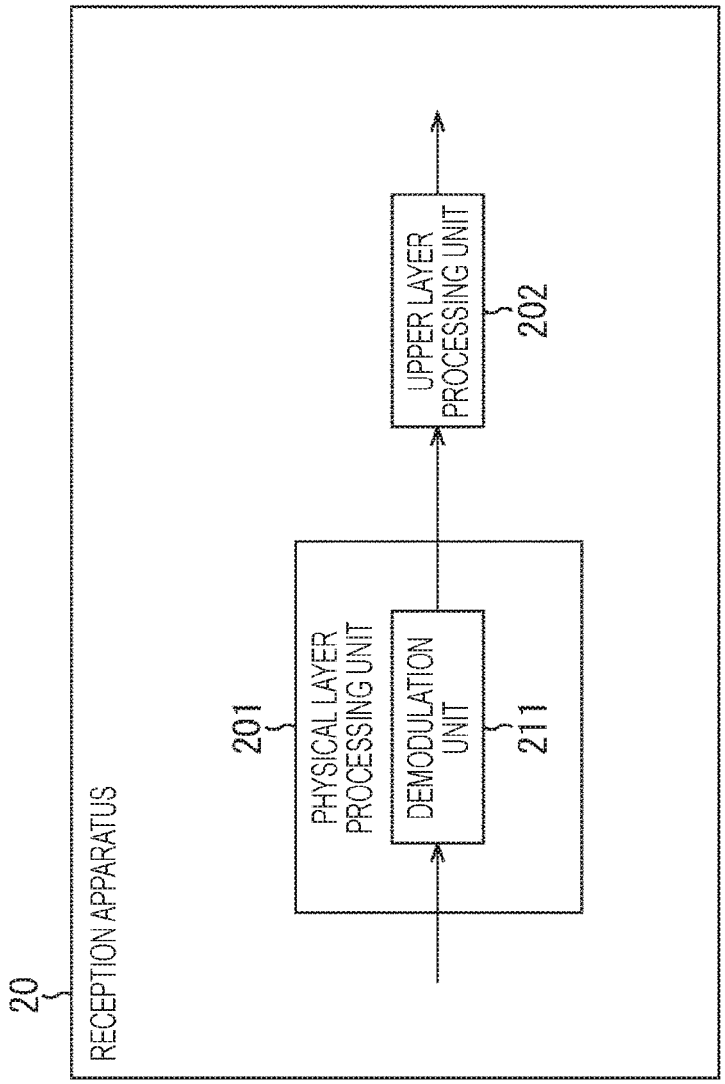
FIG. 3 is a block diagram illustrating a configuration example of a reception apparatus.

FIG. 3 is a block diagram illustrating a configuration example of the reception apparatus 20 of FIG. 1.

In FIG. 3, the reception apparatus 20 includes a physical layer processing unit 201 and an upper layer processing unit 202.

The physical layer processing unit 201 receives a transmission signal (for example, a broadcast signal such as an OFDM signal) transmitted from the transmission apparatus 10, performs physical layer processing on the transmission signal, and supplies the resultant transmission data to the upper layer processing unit 202.

The physical layer processing unit 201 includes a demodulation unit 211. The demodulation unit 211 performs demodulation processing on the transmission signal. As this demodulation processing, for example, processing such as quadrature demodulation, FFT calculation, and transmission path decoding is performed. Furthermore, in the transmission path decoding, for example, time deinterleaving, frequency deinterleaving, demapping for demodulating a data carrier, error correction decoding, and the like are performed.

The upper layer processing unit 202 performs upper layer processing on the transmission data supplied from the physical layer processing unit 201, and outputs the resultant video and audio of the content of the program to the display and speaker in the subsequent stage.

In the transmission system 1 configured as described above, the reception apparatus 20 receives a transmission signal (broadcast signal such as an OFDM signal) compatible with a predetermined broadcasting method, which is transmitted from the transmission apparatus 10. Here, for example, the predetermined broadcasting method includes broadcasting systems such as ISDB-T (including next-generation ISDB-T), ATSC (Including ATSC3.0, which is one of systems of next-generation terrestrial digital television broadcasting), which is a system adopted in the United States and the like.

By the way, as overhead of the physical layer of a broadcast signal such as an OFDM signal, for example, a pilot signal, guard interval (GI), or the like is assumed.

FIG. 4 shows an example of overhead due to a pilot signal of next-generation ISDB-T.

FIG. 4 shows overhead in a case where the FFT size is 8K, 16K, and 32K for each pilot pattern. Here, the pilot pattern includes a transmission multiplexing configuration control (TMCC) signal, an Lch signal, and a scattered pilot (SP) signal.

Note that, in FIG. 4, the numbers following "SP" represent an interval period Dx in the frequency direction and an interval period Dy in the time direction of the pilot signal. For example, "SP 3_2" represents interval period Dx=3 in the frequency direction and interval period Dy=2 in the time direction of the pilot signal.

As shown in FIG. 4, in SP 3_1 of an FFT size of 16K and 32K, in SP 3_2 and SP 6_1 of an FFT size of 8K, 16K, and 32K, and in SP 3_4, SP 6_2, and SP 12_1 of an FFT size of 8K, 16K, and 32K, the overhead is 8% or more. As described above, there is a large number of SP patterns having overhead of 8% or more, and the pilot signal can be inefficient.

Figure 5A:
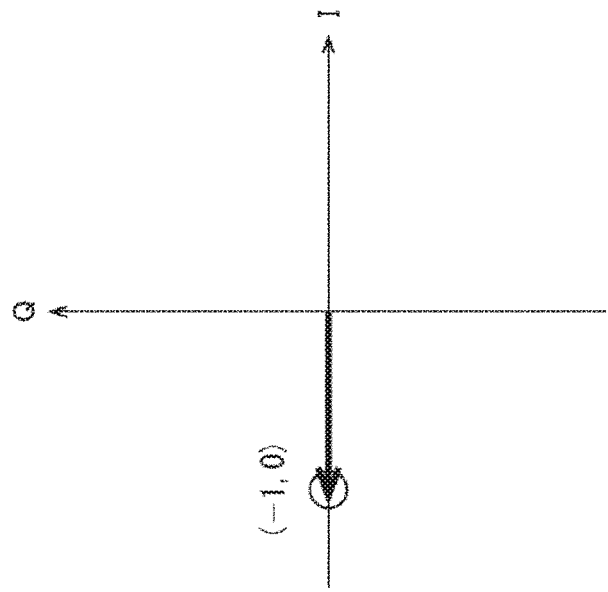
FIGS. 5A and 5B are diagrams showing an example of a basic signal space in BPSK.
Figure 5B:
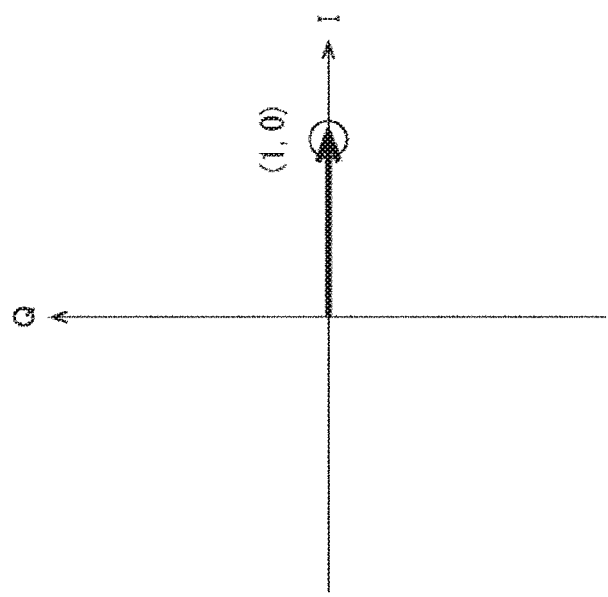

FIGS. 5A and 5B show a basic signal space (IQ constellation) in BPSK. As shown in FIGS. 5A and 5B, binary phase shift keying (BPSK) uses two phases separated by 180°, and their signal points are indicated at 0° ((1, 0) in FIG. 5A) and 180° ((−1, 0) in FIG. 5B) on a real axis (horizontal axis I). Therefore, it is unlikely to be decoded into an erroneous content, and the BPSK modulation method can be said to be a robust method.

Figure 6A:
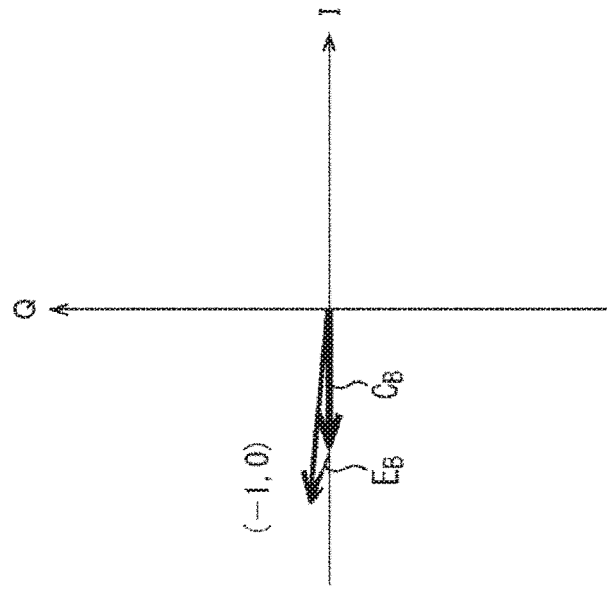
FIGS. 6A and 6B are diagrams showing an example of a signal space in BPSK in a case where LDM has been performed on a pilot signal.
Figure 6B:
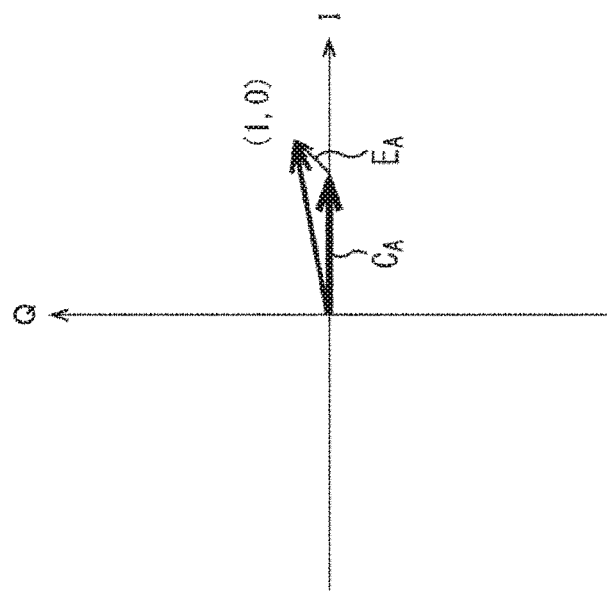

On the other hand, FIGS. 6A and 6B show a signal space (IQ constellation) in BPSK in a case where LDM has been performed on a pilot signal. Here, LDM is a method for multiplexing a tier by making a difference in power. With the method, a signal is transmitted in two or more layers by dividing the transmission power (hereinafter, description is given of the case of two layers: a core layer (CL) and an enhanced layer (EL)), and therefore, for example, the signal points are displaced by the enhanced layer with respect to the core layer.

Specifically, in FIG. 6A, the signal point is a position where a signal vector CA of the core layer and a signal vector EA of the enhanced layer are combined, and therefore the signal point is displaced as compared with the signal point of 0° shown in FIG. 5A. Similarly, in FIG. 6B, the signal point is a position where a signal vector CB of the core layer and a signal vector EB of the enhanced layer are combined, and therefore the signal point is displaced as compared with the signal point of 180° shown in FIG. 5B.

In this way, in a case where LDM is performed on the pilot signal, the transmission signal point is displaced. However, when conditions of appropriate parameters are given, the influence on the entire pilot signal can be reduced (the signal of the enhanced layer becomes noise, but its influence can be reduced). These parameters can include, for example, an injection parameter such as an injection level indicating a power ratio between the core layer and the enhanced layer.

Then, in the present technology, when LDM is performed on the pilot signal, regarding the core layer and the enhanced layer of LDM, the core layer includes the actual pilot signal (known signal) and the enhanced layer includes transmission data (various data excluding the pilot signal). Note that, in the embodiments of the present technology, the SP signal representative of the pilot signal is particularly described; however, other pilot signals such as a continual pilot (CP) signal, a TMCC signal, and an auxiliary channel (AC) signal may be used.

Therefore, when LDM is performed on a pilot signal, transmission data can be included in the enhanced layer and therefore data transmission can be performed efficiently. Furthermore, since the core layer includes the actual pilot signal, it can be demodulated in a case where the pilot signal is present (for example, even in a case where the pilot signal is present in TMCC or AC, it can be demodulated similarly).

Note that it is possible to suppress the influence of channel estimation of the core layer depending on the robustness of the core layer. Furthermore, regarding the influence of channel estimation by the enhanced layer, when the noise is not sufficiently removed, the influence can be large.

Furthermore, for the sake of clarity, a case of using BPSK is used herein as an example of a modulation method; however, the method is not limited to BPSK and another modulation method such as quaternary phase shift keying (QPSK), 16 quadrature amplitude modulation (QAM), 64QAM, 256QAM, 1024QAM, and 4096QAM can be applied, for example.

Next, the transmission power of LDM will be described. FIGS. 7A and 7B schematically show transmission power in a case where TDM is used for comparison with transmission power in a case where LDM is used. In FIGS. 7A and 7B, the transmission power level is indicated by 0 to 100. FIG. 7A represents the case where noise is absent, while FIG. 7B represents the case where noise is present.

Furthermore, FIGS. 8A, 8B, 8C, 8D, 9A, 9B, 9C, and 9D schematically show transmission power in a case where LDM is used. However, FIGS. 8A, 8B, 8C, and 8D show the transmission power of a data carrier (data symbol), while FIGS. 9A, 9B, 9C, and 9D show the transmission power of a pilot signal (for example, SP signal).

Note that, as shown in FIGS. 9A, 9B, 9C, and 9D, the power level of the core layer including the pilot signal is boosted. Therefore, in FIGS. 9A, 9B, 9C, and 9D, the transmission power of the pilot signal is larger than the transmission power of the data carrier shown in FIGS. 8A, 8B, 8C, and 8D.

In FIGS. 8A, 8B, 8C, and 8D, in a case where the injection level is 3 dB, the case where noise is absent is shown in FIG. 8A, while the case where noise is present is shown in FIG. 8B. Furthermore, in a case where the injection level is 6 dB, the case where noise is absent is shown in FIG. 8C, while the case where noise is present is shown in FIG. 8D.

Furthermore, in FIGS. 9A, 9B, 9C, and 9D, when LDM is applied to the pilot signal, in a case where the core layer and the enhanced layer include the actual pilot signal, the case where noise is absent is shown in FIG. 9A, while the case where noise is present is shown in FIG. 9B. In this case, channel estimation and the like are performed using the pilot signal included in the core layer and the enhanced layer.

On the other hand, in the present technology, when LDM is applied to the pilot signal, the core layer includes the actual (original) pilot signal, while the enhanced layer includes (a part of) the transmission data. That is, LDM divides and sends the transmission power in two or more layers (for example, the core layer and the enhanced layer), and the actual pilot signal is transmitted in the core layer, and (a part of) the transmission data is sent using the enhanced layer, which is an upper layer. Note that, here, it is preferable that the core layer be a more robust layer.

In FIGS. 9A, 9B, 9C, and 9D, when LDM is applied to the pilot signal, in a case where the transmission data is included in the enhanced layer, the case where noise is absent is shown in FIG. 9C, while the case where noise is present is shown in FIG. 9D. Here, as shown in FIG. 9D, in a case where noise is present, the signal including (transmission data transmitted by) the enhanced layer becomes noise with respect to the pilot signal, but in order to reduce the influence (to reduce the influence on the entire pilot signal), it is necessary to give appropriate parameter conditions.

For example, as the injection level increases (for example, in the case of an increase from 3 dB to 6 dB as shown in FIGS. 8A, 8B, 8C, and 8D), the influence of increased noise ("Noise" in FIG. 9D) can be reduced. Therefore, in consideration of this, it is only required to set appropriate parameters. Note that, here, as the injection level, 3 dB and 6 dB are shown, but, for example, 9 dB or the like may be used, and it is assumed that the scheme becomes favorable as the injection level increases (that is, the smaller the enhanced layer, the smaller the influence of the noise).

Furthermore, in the above description, although description is given of the case where the LDM includes the two layers, namely, the core layer and the enhanced layer, the number of layers may be two or more. Moreover, in the above description, the upper layer of the core layer is described as the enhanced layer, but the enhanced layer may be the lower layer of the core layer.

Figure 10:
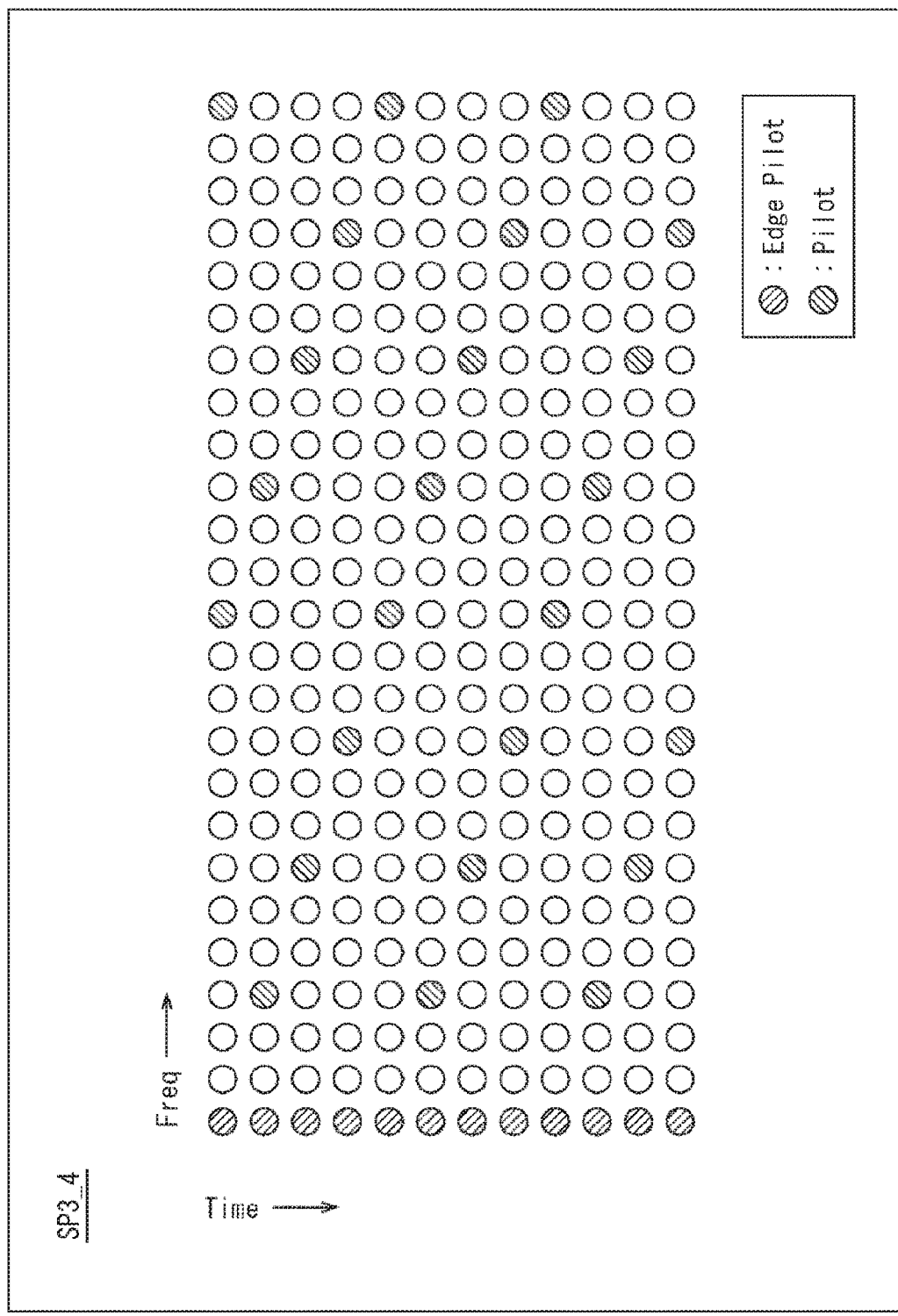
FIG. 10 is a diagram showing an example of arrangement of pilot signals.

Note that, as shown in FIG. 10, pilot signals are arranged at predetermined intervals with respect to a plurality of transmission symbols represented by circles in the drawing. In FIG. 10, pilot signals are arranged in a distribution according to SP3_4 with respect to a plurality of transmission symbols arranged in a region represented in a frequency direction and a time direction. That is, in FIG. 10, the pilot signals are arranged according to the interval period Dx=3 in the frequency direction and the interval period Dy=4 in the time direction. Then, as described above, LDM is performed on these pilot signals, the actual pilot signals are included in the core layer, and (a part of) the transmission data is included in the enhanced layer.

Next, with reference to FIGS. 11, 12, 13A, 13B, 13C, 13D, 13E, 14, 15A, 15B, 15C, 15D, and 15E, flows of processing executed by the transmission apparatus 10 on a transmission side and the reception apparatus 20 on a reception side is described.

(Flows of Processing on the Transmission Side and Processing on the Reception Side)

First, the flows of processing on the transmission side and processing on the reception side will be described with reference to the flowchart in FIG. 11.

In step S11, the upper layer processing unit 101 of the transmission apparatus 10 performs upper layer processing. In this upper layer processing, transmission data is generated on the basis of the video, audio and the like of the content of a program.

In step S12, the physical layer processing unit 102 of the transmission apparatus 10 performs physical layer processing. In this physical layer processing, a transmission signal is generated by modulating transmission data, and the generated transmission signal is transmitted via a transmission antenna. The transmission signal transmitted from the transmission apparatus 10 is received by the reception apparatus 20 via a reception antenna.

In step S21, the physical layer processing unit 201 of the reception apparatus 20 performs physical layer processing. In this physical layer processing, transmission data is generated by demodulating the received transmission signal. Note that details of the physical layer processing will be described later with reference to the flowchart of FIG. 12 or 14.

In step S22, the upper layer processing unit 202 of the reception apparatus 20 performs upper layer processing. In this upper layer processing, video and audio of the content of a program are generated on the basis of the transmission data and output to a display and a speaker.

(Physical Layer Processing Compatible with ISDB-T)

Next, with reference to the flowchart of FIG. 12, a flow of physical layer processing compatible with ISDB-T will be described as an example of the physical layer processing executed in the processing of step S21 of FIG. 11. However, in describing FIG. 12, the schematic diagram shown in FIGS. 13A, 13B, 13C, 13D, and 13E are referred to as appropriate.

In step S211, the physical layer processing unit 201 demodulates the data.

Here, LDM is applied to the pilot signal (e.g., SP signal), the core layer includes the pilot signal, and the enhanced layer includes (a part of) the transmission data, and therefore a portion including the enhanced layer corresponds to noise ("Noise" in the drawing) (FIG. 13A). Note that the power level of the core layer including the pilot signal is boosted.

In step S212, the physical layer processing unit 201 performs channel estimation and equalization processing using the pilot signal.

However, this pilot signal includes noise ("Noise" in the drawing). Furthermore, here, channel estimation and equalization processing are performed such that the deterioration of reception characteristics for the transmission signal including the data carrier is improved (FIG. 13B).

In step S213, the physical layer processing unit 201 decodes the data of the core layer. Note that, here, for example, by making the core layer a more robust layer, the influence of the pilot signal including noise is minimized.

In step S214, the physical layer processing unit 201 estimates noise.

Here, for example, noise estimation can be performed using a pilot signal such as a TMCC signal or an AC signal included in an OFDM frame (FIG. 13C). Note that a transmission multiplexing configuration control (TMCC)

signal is transmission control information for performing demodulation processing and the like. Furthermore, an auxiliary channel (AC) signal includes additional information regarding broadcasting.

In step S215, the physical layer processing unit 201 removes the pilot signal (for example, a known SP signal) and the estimated noise from the pilot signal (for example, the SP signal) to which LDM has been applied.

Here, as shown in FIG. 13D, in a case where LDM has been performed on the pilot signal (SP signal), the core layer includes the actual pilot signal (known SP signal) and the enhanced layer includes (a part of) the transmission data. Furthermore, noise (corresponding to the estimated noise estimated in the processing of S214) is added. Therefore, by removing the known SP signal and estimated noise from the pilot signal (SP signal) to which LDM has been applied, it is possible to obtain the data included in the enhanced layer, that is, (a part of) the transmission data (FIG. 13E).

In step S216, the physical layer processing unit 201 demodulates (a part of) the transmission data of the enhanced layer.

Here, by removing the known SP signal and the estimated noise as described above, it is possible to obtain (a part of) the transmission data included in the enhanced layer, and therefore (a part of) the transmission data is demodulated (FIG. 13E). In this way, in a case where LDM has been performed on the pilot signal and the transmission data is included, the transmission data can be extracted.

Figure 11:
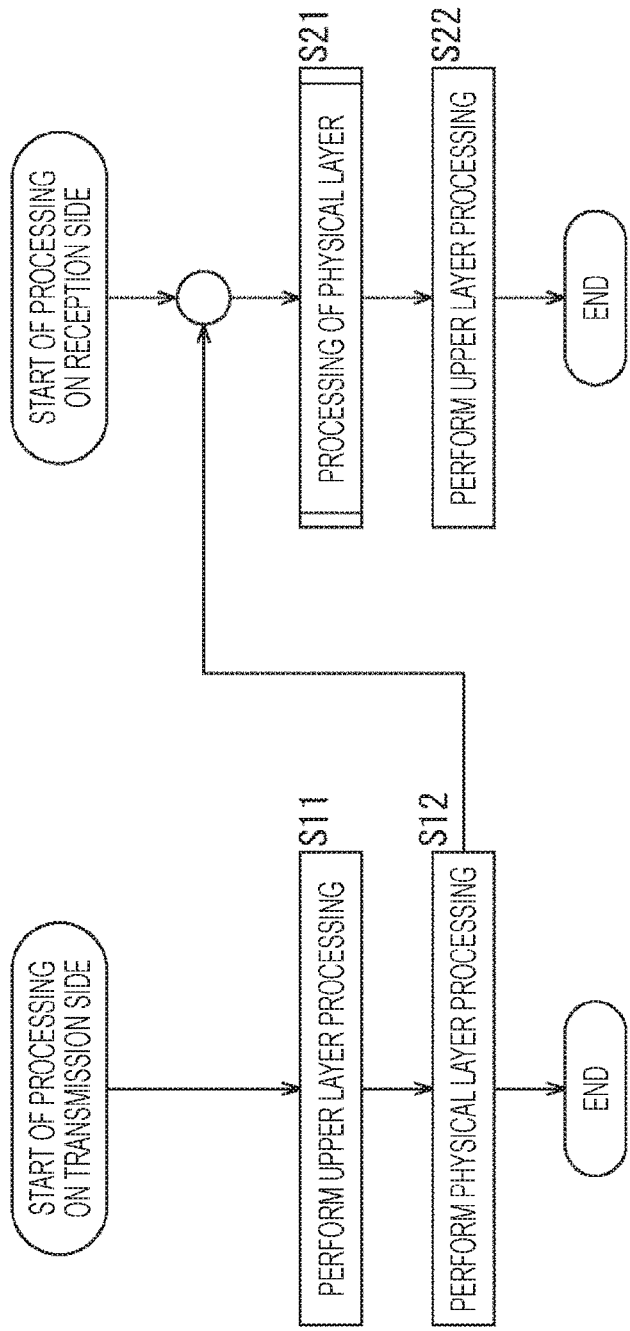
FIG. 11 is a flowchart explaining the flows of processing on a transmission side and processing on a reception side.
Figure 12:
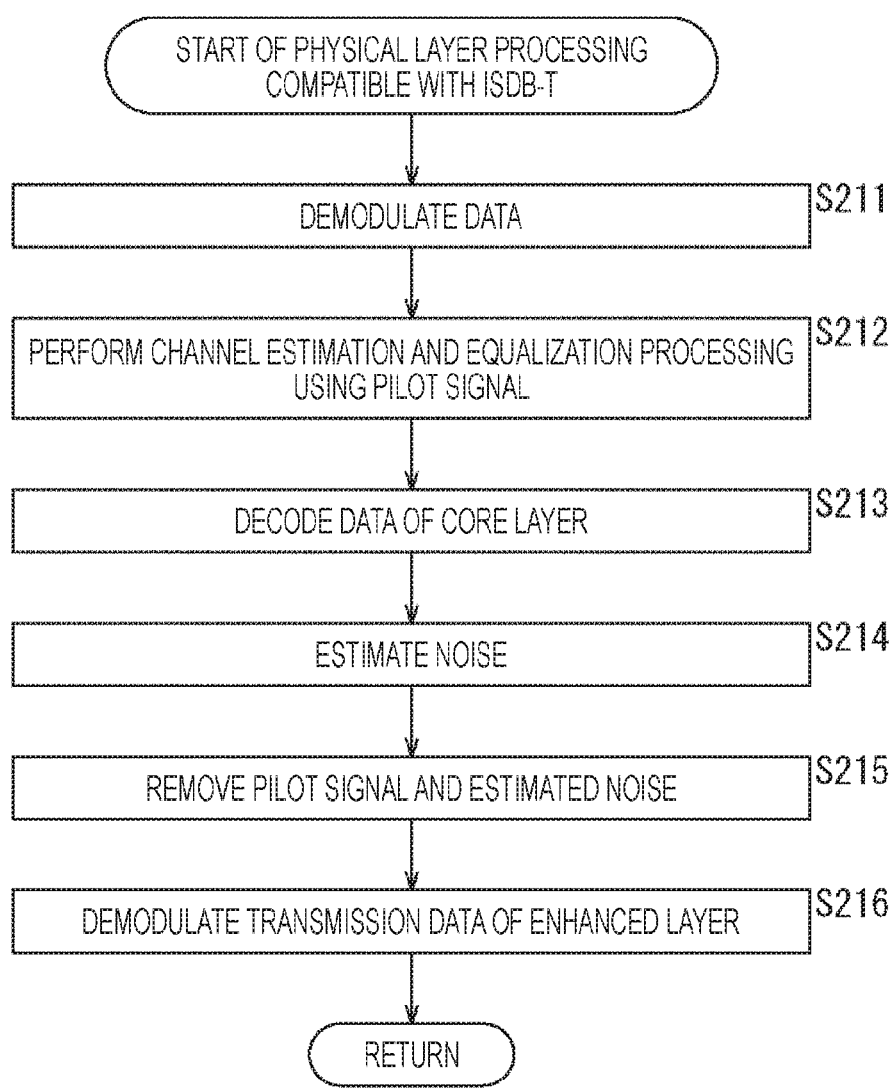
FIG. 12 is a flowchart explaining the flow of physical layer processing compatible with ISDB-T.

When the processing of step S216 ends, the processing returns to the processing of step S21 of FIG. 11, and the subsequent processing is executed.

(Physical Layer Processing Compatible with ATSC)

Figure 14:
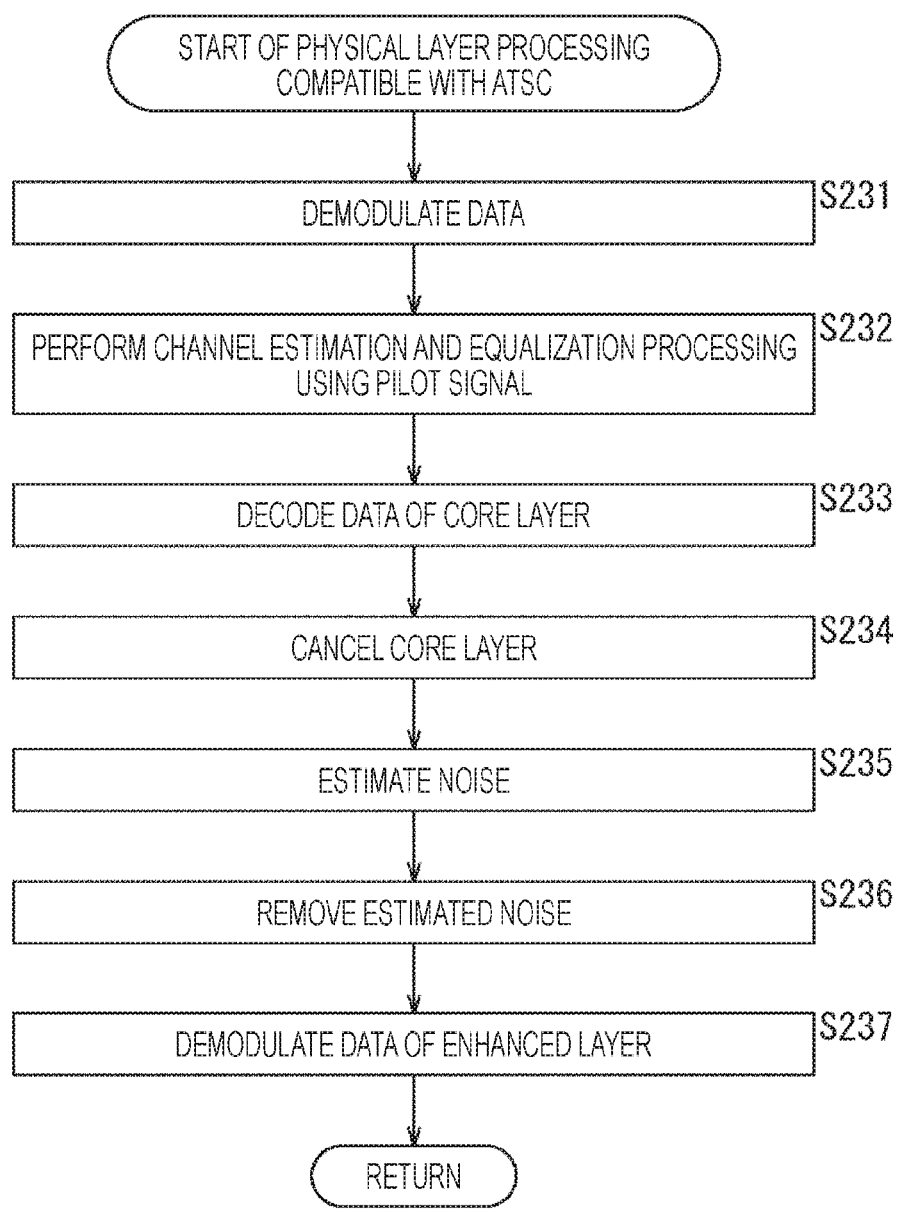
FIG. 14 is a flowchart explaining the flow of physical layer processing compatible with ATSC.

Next, with reference to the flowchart of FIG. 14, a flow of physical layer processing compatible with ATSC will be described as an example of the physical layer processing executed in the processing of step S21 of FIG. 11. However, in describing FIG. 14, the schematic diagram shown in FIGS. 15A, 15B, 15C, 15D, and 15E are referred to as appropriate.

Figure 15:
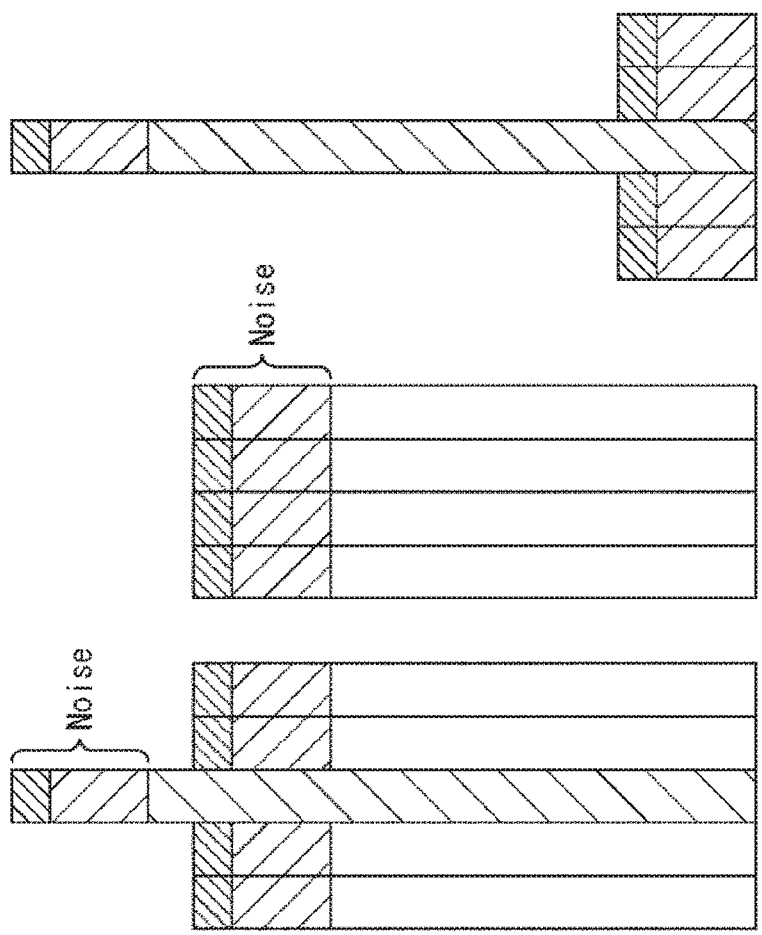
FIGS. 15A, 15B, 15C, 15D, and 15E are schematic diagrams for explaining the flow of physical layer processing compatible with ATSC.

In step S231, the physical layer processing unit 201 demodulates the data. Here, LDM is applied to the pilot signal, the core layer includes the pilot signal, and the enhanced layer includes (a part of) the transmission data, and therefore a portion including the enhanced layer corresponds to noise ("Noise" in the drawing) (FIG. 15A). Furthermore, LDM is also applied to the data carrier, and the core layer and the enhanced layer are present (FIG. 15A).

In step S232, the physical layer processing unit 201 performs channel estimation and equalization processing using the pilot signal including the noise. Here, channel estimation and equalization processing are performed such that the deterioration of reception characteristics for the transmission signal including the data carrier to which LDM has been performed is improved (FIG. 15B).

In step S233, the physical layer processing unit 201 decodes the data of the core layer. Note that, here also, for example, by making the core layer a more robust layer, the influence of the pilot signal including noise can be minimized.

In step S234, the physical layer processing unit 201 cancels the core layer. Here, when considering the sum of the core layer, the enhanced layer, and the noise, the enhanced layer and the noise portion are left as a result of canceling the core layer portion (FIGS. 15C and 15D). In other words, a portion corresponding to noise including the enhanced layer ("Noise" in FIGS. 15A and 15B) is obtained.

In step S235, the physical layer processing unit 201 estimates noise. Here, for example, noise estimation using a continual pilot (CP) signal can be performed (FIG. 15D).

In step S236, the physical layer processing unit 201 removes the estimated noise. Here, LDM is also applied to the data carrier in addition to the pilot signal. Since the enhanced layer is present, it is possible to obtain the data included in the enhanced layer by removing the estimated noise (see FIGS. 15D and 15E).

In step S237, the physical layer processing unit 201 demodulates the data of the enhanced layer. Here, (a part of) the transmission data is obtained as the data of the enhanced layer from the data carrier and the pilot signal to which the LDM has been applied (FIG. 15E).

When the processing of step S237 ends, the processing returns to the processing of step S21 of FIG. 11, and the subsequent processing is executed.

Heretofore, the flow of the processing executed by the transmission apparatus 10 on the transmission side and the reception apparatus 20 on the reception side has been described.

Note that, in the above description, as the physical layer processing on the reception side (S21 in FIG. 11), the physical layer processing compatible with ISDB-T (FIG. 12) and the physical layer processing compatible with ATSC (FIG. 14) are described. However, those physical layer processing are an example, and physical layer processing according to a broadcasting method is performed.

Next, an example of arrangement of pilot signals to which the present technology is applied in a case where FDM or TDM is adopted as a method for multiplexing a broadcast signal will be described.

(Example of FDM)

Figure 16:
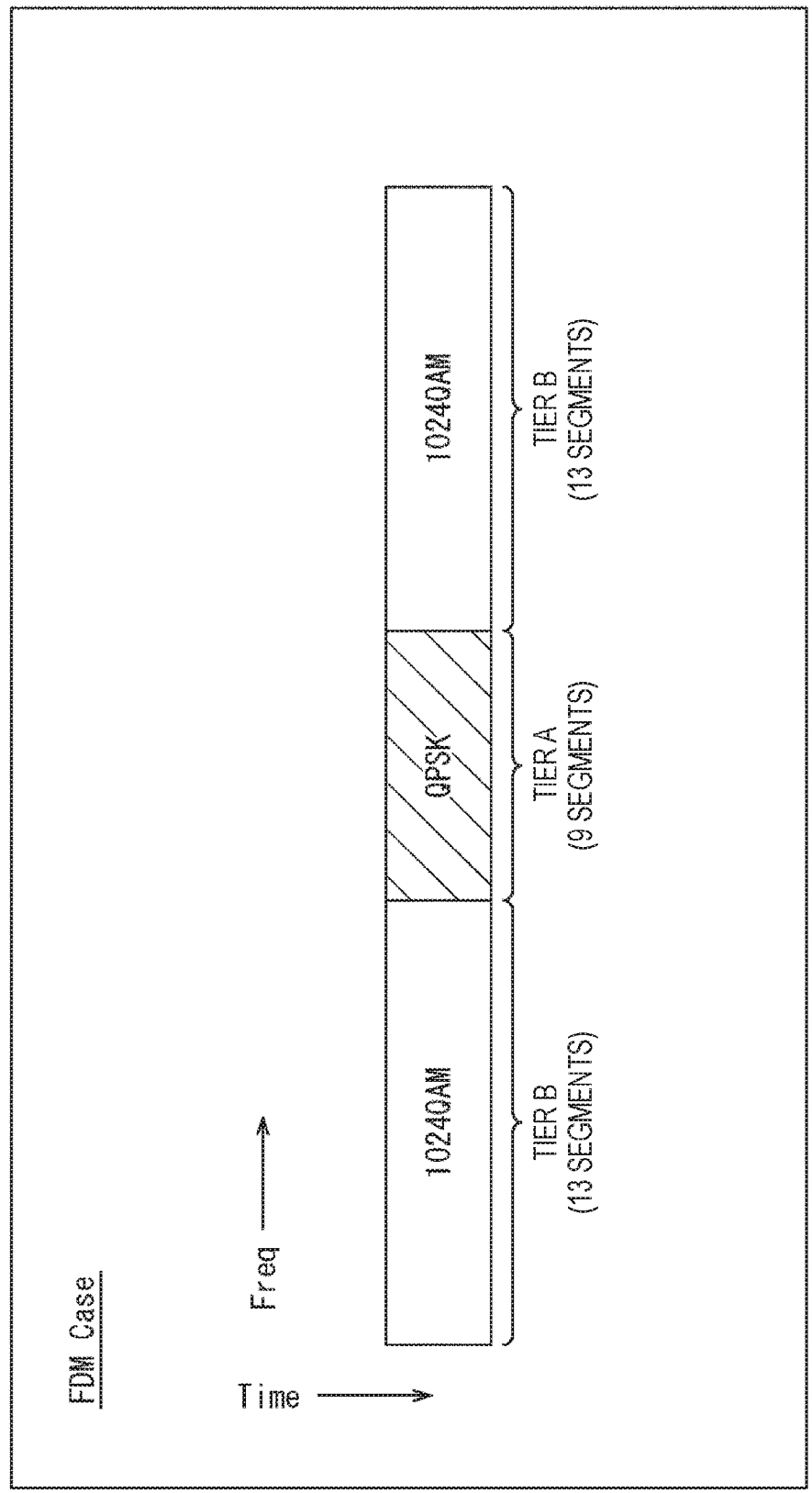
FIG. 16 is a diagram showing an example of arrangement of a pilot signal to which the present technology is applied in a case where FDM is adopted.

FIG. 16 is a diagram showing an example of arrangement of a pilot signal to which the present technology is applied in a case where FDM is adopted.

FDM is a multiplexing method in which a frequency band for transmitting a plurality of transmission signals (broadcast signals) is divided and transmission is performed with one transmission path. For example, in current ISDB-T, FDM is adopted as a method for multiplexing a broadcast signal.

FIG. 16 shows the configuration of a physical layer frame in a case where FDM is applied when the direction from the left side to the right side in the drawing is a frequency (Freq) direction and the direction from the upper side to the lower side in the drawing is a time (Time) direction. By applying FDM, for example, in a case where frequency is divided into 35 segments, a central tier A can include 9 segments, and right and left tiers B can include the remaining 26 segments (13 segments each).

At this time, in a case where different modulation methods are applied to the tier A and the tiers B, the pilot signal to which the present technology is applied is included only in one of the tiers on which a more robust modulation method has been performed. More specifically, as shown in FIG. 16, in a case where the modulation methods applied to the tier A and the tiers B are, for example, QPSK and 1024QAM, respectively, only tier A on which the more robust modulation method has been performed includes a pilot signal to which the present technology has been applied.

In this way, in a case where FDM is adopted as a method for multiplexing a broadcast signal, when only the tier A includes a pilot signal to which the present technology has been applied, i.e., a pilot signal on which LDM has been performed and the core layer includes the pilot signal and the enhanced layer includes (a part of) the transmission data, in performing channel estimation or equalization processing, a portion including the enhanced layer corresponds to noise, with limited influence on only the tier A (no influence on the tier B).

Furthermore, since the tier A is a layer to which a more robust modulation method (for example, QPSK) has been applied, as a result of including a pilot signal to which the present technology has been applied, extremely small influence will be made (i.e. the influence of noise can be minimized) even when channel estimation and equalization processing using a pilot signal including noise are performed.

Note that, here, the two tiers: the tier A and the tier B are described as an example, but similarly, even when there are three or more tiers, it is only required to include the pilot signal to which the present technology has been applied in a tier to which a more robust modulation method has been applied.

(Example of TDM)

Figure 17:
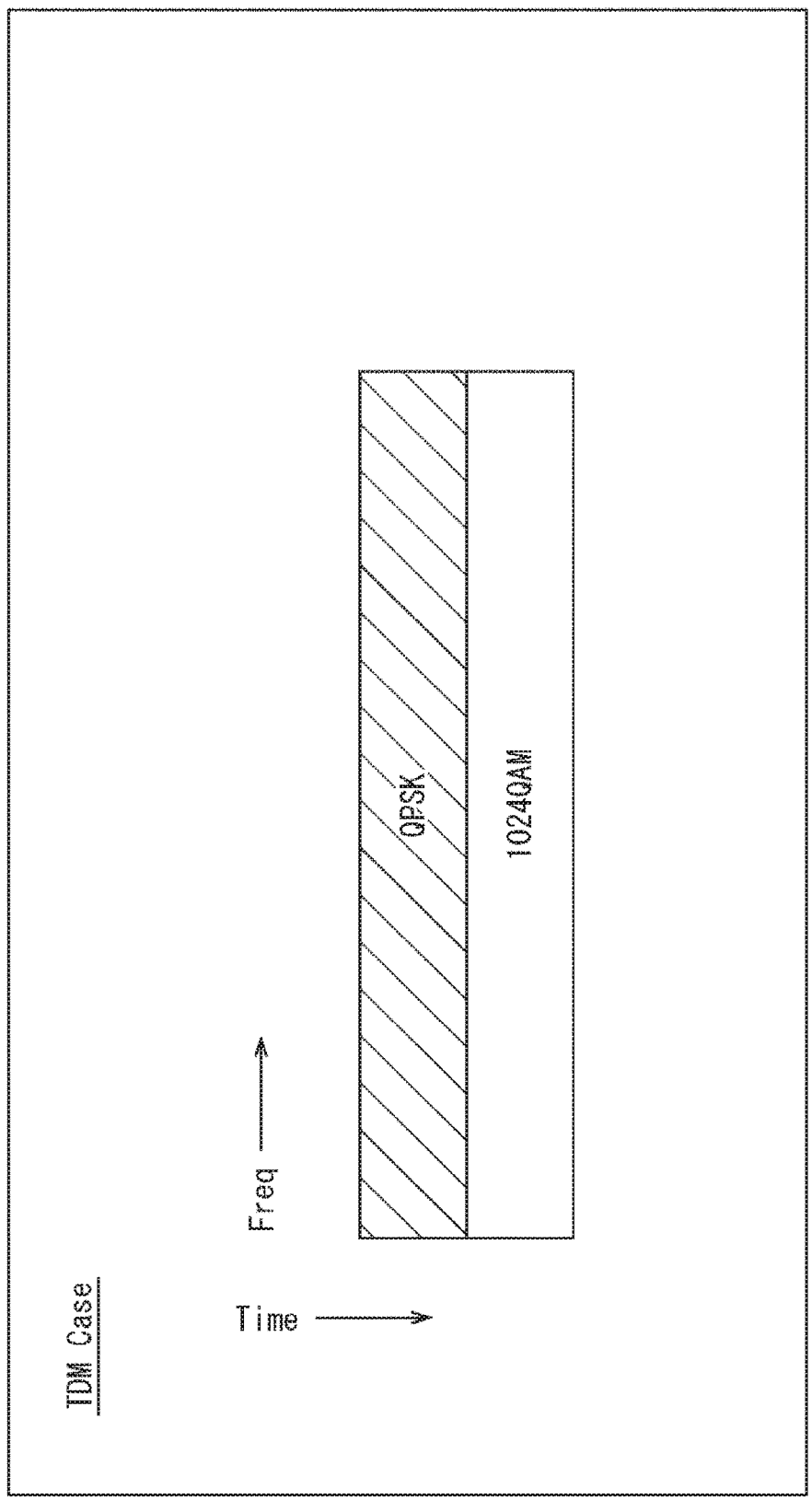
FIG. 17 is a diagram showing an example of arrangement of a pilot signal to which the present technology is applied in a case where TDM is adopted.

FIG. 17 is a diagram showing an example of arrangement of a pilot signal to which the present technology is applied in a case where TDM is adopted.

TDM is a multiplexing method in which a plurality of transmission signals (broadcast signals) is temporally arranged and transmitted with one transmission path. For example, in ATSC 3.0, which is one of the broadcasting methods of next-generation terrestrial digital television broadcasting, TDM is adopted as a broadcast signal multiplexing method.

FIG. 17 shows the configuration of a physical layer frame in a case where TDM is applied when the direction from the left side to the right side in the drawing is a frequency (Freq) direction and the direction from the upper side to the lower side in the drawing is a time (Time) direction. In the example of FIG. 17, a first layer (tier) that precedes in time and a second layer (tier) that follows the first layer are shown. Note that, here, for the sake of convenience of description, expressions such as a first layer and a second layer are used; however, these layers can also be paraphrased as, for example, a frame or a subframe constituting a physical layer frame.

At this time, in a case where a different modulation method is applied to each of the tiers (layers), namely, the first layer and the second layer, the pilot signal to which the present technology has been applied is included only in one tier (layer) on which a more robust modulation method has been performed. More specifically, as shown in FIG. 17, in a case where the modulation methods applied to the first layer and the second layer are, for example, 1024QAM and QPSK, respectively, only the second layer on which the more robust modulation method has been performed includes the pilot signal to which the present technology has been applied.

In this way, in a case where TDM is adopted as a method for multiplexing a broadcast signal, when a pilot signal to which the present technology is applied, i.e., a pilot signal on which LDM has been performed, is included only in the tier (layer) on which a more robust modulation method has been performed and the core layer includes the pilot signal and the enhanced layer includes (a part of) the transmission data, in performing channel estimation or equalization processing, a portion including the enhanced layer corresponds to noise, without influencing another layer. Furthermore, as a result of including the pilot signal to which the present technology is applied only in a tier (layer) to which a more robust modulation method (for example, QPSK) is applied, extremely small influence will be made even when channel estimation and equalization processing using a pilot signal including noise is performed.

As described above, according to the present technology, as a method for multiplexing a transmission signal (broadcast signal such as an OFDM signal), for example, in a case where FDM or TDM is adopted, or other cases, when LDM is applied to a pilot signal and the (actual) pilot signal is included in the core layer, while (a part of) the transmission data is included in the enhanced layer, it is possible to efficiently perform data transmission by using the pilot signal.

Note that, in the above description, as a pilot signal to which the present technology has been applied, the SP signal has been described as a representative, but the application of the present technology is not limited to the SP signal, but may be applied to other pilot signals such as a CP signal, a TMCC signal, and an AC signal, for example.

Here, the pilot signal to which the present technology has been applied has been found as a result of a detailed simulation by the inventor of the present technology. As one example below, the results of a simulation assuming next-generation ISDB-T and the results of a simulation assuming ATSC3.0 are shown.

(Assuming Next-Generation ISDB-T)
Total number of cells per frame
Up to 288 SP/segment*35 segments 56 symbols/frame=564,480 cells
4096QAM:
564480*12=6773760 bits=6.7 Mbps (max)
5.1 Mbps in a case where the coding rate is 12/16
1024QAM:
564480*10=5644800 bits=5.6 Mbps (max)
4.2 Mbps in a case where the coding rate is 12/16
256QAM:
564480 8=4515840 bits=4.5 Mbps (max)
3.4 Mbps in a case where the coding rate is 12/16
(Assuming ATSC 3.0)
Larger Data Rate for Enhanced Layer
VV323
CL: QPSK CR=7/15
EL: 256QAM CR=10/15
SP8_2 (every 16 carriers), GI4_768, Symbols 108
Frame Length=250 ms
NoC (16FFT) 13825
Data Carriers per Symbol: 12863 (non-data carriers=962)
SP Carriers per Symbol: 864
Total SP carriers per frame: 864*108=93,312 cells
Extra Data Rate=93312*8 bits/cell=746,496 bit=750 kbit→about 3 Mbps
497,664=1.99 Mbps in a case where the coding rate is 10/15
Data for EL=12863*108=11,113,632 bit=11.1 Mbit→About 44 Mbps
7,409,088 4=29.636 Mbps in a case where the coding rate is 10/15
Transmission capacity increase=6.7%

2. Variation

In the above description, although description is given of the cases where, as the broadcasting system, ISDB (especially next-generation ISDB-T) which is a method adopted in Japan and the like is used and ATSC (especially ATSC3.0) which is a method adopted in the United States and the like is used. However, the present technology may be applied to other broadcasting methods such as DVB (especially next-generation DVB-T) which is a method adopted by European countries and the like. Furthermore, the transmission path of a broadcast signal (broadcast transmission path) may be not only terrestrial broadcasting, but also, for example, satellite broadcasting using a broadcasting satellite (BS) or communications satellite (CS), cable broadcasting such as cable television (CATV), or the like.

Furthermore, in the transmission system 1 of FIG. 1, the transmission apparatus 10 is illustrated to independently include the upper layer processing unit 101 such as a multiplexer and the physical layer processing unit 102 such as the modulation unit 111. In a general digital broadcasting system, the upper layer processing unit 101 and the physical layer processing unit 102 are installed at different locations. That is, for example, a first broadcast server (upper layer server) having the upper layer processing unit 101 can be installed in a broadcasting station, while a second broadcast server (physical layer server) having the physical layer processing unit 102 can be installed at a transmission station. In other words, it can be said that the transmission apparatus 10 (or the transmission system 1) is a broadcasting system and includes one or a plurality of broadcast servers.

Furthermore, in the above description, the broadcast transmission path such as terrestrial broadcast has been described as the transmission path. However, the present technology is not limited to the broadcast transmission path, but, may be applied to, for example, a communication signal (transmission signal) transmitted through a communication transmission path including wireless communication such as cellular communication (for example, LTE-Advanced or 5G), a wireless local area network (LAN), or the like. That is, in this case, the transmission apparatus 10 (or the transmission system 1) is a communication system (wireless communication system) and includes one or a plurality of communication servers. Furthermore, in this case, the reception apparatus 20 is a device having a communication function such as a smartphone, a mobile phone, a tablet computer, or the like.

3. Configuration of Computer

Figure 18:
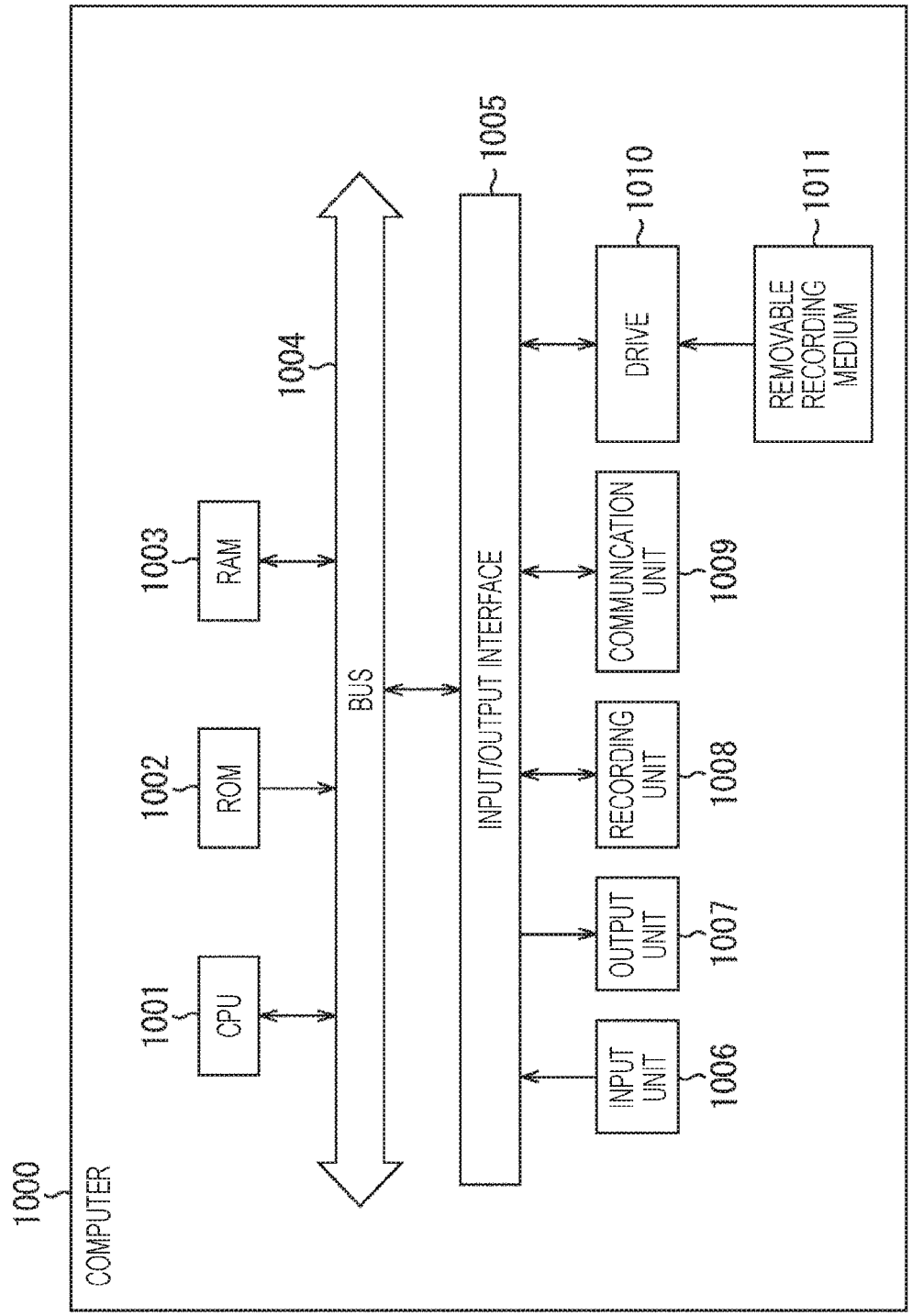
FIG. 18 is a block diagram illustrating a configuration example of an embodiment of a computer to which the present technology has been applied.

The series of processing described above can be executed by hardware and it can also be executed by software. In a case where the series of processing is executed by software, a program constituting the software is installed in a computer. FIG. 18 is a diagram illustrating a configuration example of hardware of a computer in which the series of processing described above (for example, the processing on the transmission side or the processing on the reception side described above) is executed by a program.

In the computer 1000, a central processing unit (CPU) 1001, a read only memory (ROM) 1002, a random access memory (RAM) 1003, are interconnected by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured in the manner described above, the series of processing described above is performed, for example, such that the CPU 1001 loads a program recorded in the ROM 1002 or the recording unit 1008 into the RAM 1003 via the input/output interface 1005 and the bus 1004 and executes the program.

The program to be executed by the computer 1000 (CPU 1001) can be provided by being recorded on the removable recording medium 1011, for example, as a package medium or the like. Furthermore, the program can be provided via a wired or wireless transmission medium such as a local area network, the Internet, or digital satellite broadcasting.

In the computer 1000, the program can be installed on the recording unit 1008 via the input/output interface 1005 when the removable recording medium 1011 is mounted on the drive 1010. Furthermore, the program can be received by the communication unit 1009 via a wired or wireless transmission medium and installed on the recording unit 1008. In addition, the program can be pre-installed on the ROM 1002 or the recording unit 1008.

Here, in the present specification, the processing performed by the computer according to the program is not necessarily needed to be performed in chronological order along the procedure described as the flowchart. In other words, the processing performed by the computer according to the program also includes processing that is executed in parallel or individually (e.g., parallel processing or processing by an object). Furthermore, the program may be processed by a single computer (processor) or may be processed in a distributed manner by a plurality of computers.

Note that the embodiment of the present technology is not limited to the aforementioned embodiments, but various changes may be made within the scope not departing from the gist of the present technology.

Furthermore, the present technology may adopt the configuration described below.

(1)

A reception apparatus including:

a processing unit that, when a transmission signal including transmission data is received, processes the transmission signal including a pilot signal on which layered division multiplexing (LDM) has been performed, and demodulates a part of the transmission data included in a second layer which is different from a first layer including the pilot signal.

(2)

The reception apparatus according to (1), in which a core layer of the LDM includes the pilot signal, and an enhanced layer of the LDM includes a part of the transmission data.

(3)

The reception apparatus according to (1) or (2), in which the transmission signal includes a broadcast signal.

(4)

The reception apparatus according to (3), in which the broadcast signal is multiplexed by frequency division multiplexing (FDM).

(5)

The reception apparatus according to (4), in which a layer divided in a frequency direction includes a first tier and a second tier on which different modulation methods have been performed, and the pilot signal is included in one tier of the first tier and the second tier on which a more robust modulation method has been performed.

(6)

The reception apparatus according to (4) or (5), in which the broadcast signal includes a signal compatible with Integrated Services Digital Broadcasting-Terrestrial (ISDB-T).

(7)

The reception apparatus according to (3), in which the broadcast signal is multiplexed by time division multiplexing (TDM).

(8)

The reception apparatus according to (7), in which a layer divided in a time direction includes a first tier and a second tier on which different modulation methods have been performed, and the pilot signal is included in one tier of the first tier and the second tier on which a more robust modulation method has been performed.

(9)

The reception apparatus according to claim (7) or (8), in which the broadcast signal includes a signal compatible with Advanced Television Systems Committee (ATSC).

(10)

A reception method of a reception apparatus, in which the reception apparatus, when a transmission signal including transmission data is received, processes the transmission signal including a pilot signal on which LDM has been performed, and demodulates a part of the transmission data included in a second layer which is different from a first layer including the pilot signal.

(11)

A transmission apparatus including:

a processing unit that, when a transmission signal including transmission data is transmitted, processes the transmission signal including a pilot signal on which LDM has been performed, and modulates a part of the transmission data included in a second layer which is different from a first layer including the pilot signal.

(12)

The transmission apparatus according to (11), in which a core layer of the LDM includes the pilot signal, and an enhanced layer of the LDM includes a part of the transmission data.

(13)

The transmission apparatus according to (11) or (12), in which the transmission signal includes a broadcast signal.

(14)

The transmission apparatus according to (13), in which the broadcast signal is multiplexed by FDM.

(15)

The transmission apparatus according to (14), in which a layer divided in a frequency direction includes a first tier and a second tier on which different modulation methods have been performed, and the pilot signal is included in one tier of the first tier and the second tier on which a more robust modulation method has been performed.

(16)

The transmission apparatus according to (14) or (15), in which the broadcast signal includes a signal compatible with ISDB-T.

(17)

The transmission apparatus according to (13), in which the broadcast signal is multiplexed by TDM.

(18)

The transmission apparatus according to (17), in which a layer divided in a time direction includes a first tier and a second tier on which different modulation methods have been performed, and the pilot signal is included in one tier of the first tier and the second tier on which a more robust modulation method has been performed.

(19)

The transmission apparatus according to (17) or (18), in which the broadcast signal includes a signal compatible with ATSC.

(20)

A transmission method of a transmission apparatus, in which the transmission apparatus, when a transmission signal including transmission data is transmitted, processes the transmission signal including a pilot signal on which LDM has been performed, and modulates a part of the transmission data included in a second layer which is different from a first layer including the pilot signal.

REFERENCE SIGNS LIST

1 Transmission system
10 Transmission apparatus
20 Reception apparatus
101 Upper layer processing unit
102 Physical layer processing unit
111 Modulation unit
201 Physical layer processing unit
202 Upper layer processing unit
211 Demodulation unit
1000 Computer
1001 CPU

The invention claimed is:

1. A reception apparatus, comprising:
a processing unit configured to:
process, when a transmission signal including transmission data is received, the transmission signal including a pilot signal on which layered division multiplexing (LDM) has been performed, and
demodulate a part of the transmission data included in a second layer which is different from a first layer including the pilot signal, wherein
a core layer of the LDM includes the pilot signal,
an enhanced layer of the LDM includes a part of the transmission data,
the transmission signal includes a broadcast signal multiplexed by frequency division multiplexing (FDM),
a layer divided in a frequency direction includes a first tier and a second tier on which different modulation methods have been performed, and
the pilot signal is included in one tier of the first tier and the second tier on which a more robust modulation method has been performed.

2. The reception apparatus according to claim 1, wherein the broadcast signal includes a signal compatible with Integrated Services Digital Broadcasting-Terrestrial (ISDB-T).

3. A reception apparatus, comprising:
a processing unit configured to:
process, when a transmission signal including transmission data is received, the transmission signal including a pilot signal on which LDM has been performed, and
demodulate a part of the transmission data included in a second layer which is different from a first layer including the pilot signal, wherein
a core layer of the LDM includes the pilot signal, an enhanced layer of the LDM includes a part of the transmission data, the transmission signal includes a broadcast signal multiplexed by time division multiplexing (TDM), a layer divided in a time direction includes a first tier and a second tier on which different modulation methods have been performed, and the pilot signal is included in one tier of the first tier and the second tier on which a more robust modulation method has been performed.

4. The reception apparatus according to claim 3, wherein the broadcast signal includes a signal compatible with Advanced Television Systems Committee (ATSC).

5. A reception method of a reception apparatus, wherein the reception apparatus, when a transmission signal including transmission data is received, processes the transmission signal including a pilot signal on which LDM has been performed, and demodulates a part of the transmission data included in a second layer which is different from a first layer including the pilot signal, a core layer of the LDM includes the pilot signal, an enhanced layer of the LDM includes a part of the transmission data, the transmission signal includes a broadcast signal multiplexed by FDM, a layer divided in a frequency direction includes a first tier and a second tier on which different modulation methods have been performed, and the pilot signal is included in one tier of the first tier and the second tier on which a more robust modulation method has been performed.

6. A transmission apparatus, comprising:
a processing unit configured to:
  process, when a transmission signal including transmission data is transmitted, the transmission signal including a pilot signal on which LDM has been performed, and
  modulate a part of the transmission data included in a second layer which is different from a first layer including the pilot signal, wherein
    a core layer of the LDM includes the pilot signal,
    an enhanced layer of the LDM includes a part of the transmission data,
    the transmission signal includes a broadcast signal multiplexed by FDM,
    a layer divided in a frequency direction includes a first tier and a second tier on which different modulation methods have been performed, and
    the pilot signal is included in one tier of the first tier and the second tier on which a more robust modulation method has been performed.

7. The transmission apparatus according to claim 6, wherein
the broadcast signal includes a signal compatible with ISDB-T.

8. A transmission apparatus, comprising:
a processing unit configured to:
  when a transmission signal including transmission data is transmitted, the transmission signal including a pilot signal on which LDM has been performed, and
  modulate a part of the transmission data included in a second layer which is different from a first layer including the pilot signal, wherein
    a core layer of the LDM includes the pilot signal,
    an enhanced layer of the LDM includes a part of the transmission data,
    the transmission signal includes a broadcast signal multiplexed by TDM,
    a layer divided in a time direction includes a first tier and a second tier on which different modulation methods have been performed, and
    the pilot signal is included in one tier of the first tier and the second tier on which a more robust modulation method has been performed.

9. The transmission apparatus according to claim 8, wherein
the broadcast signal includes a signal compatible with ATSC.

10. A transmission method of a transmission apparatus, wherein
the transmission apparatus, when a transmission signal including transmission data is transmitted, processes the transmission signal including a pilot signal on which LDM has been performed, and modulates a part of the transmission data included in a second layer which is different from a first layer including the pilot signal, a core layer of the LDM includes the pilot signal, an enhanced layer of the LDM includes a part of the transmission data, the transmission signal includes a broadcast signal multiplexed by FDM, a layer divided in a frequency direction includes a first tier and a second tier on which different modulation methods have been performed, and the pilot signal is included in one tier of the first tier and the second tier on which a more robust modulation method has been performed.

* * * * *